(12) United States Patent
Isele et al.

(10) Patent No.: US 10,966,294 B2
(45) Date of Patent: *Mar. 30, 2021

(54) ILLUMINATION DEVICE

(71) Applicant: Bayerische Motoren Werke Aktiengesellschaft, Munich (DE)

(72) Inventors: Robert Isele, Fuerstenfeldbruck (DE); Juergen Bruegl, Munich (DE); Florian Altinger, Shenyang (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 201 days.

This patent is subject to a terminal disclaimer.

(21) Appl. No.: 16/178,907

(22) Filed: Nov. 2, 2018

(65) Prior Publication Data

US 2019/0075631 A1  Mar. 7, 2019

Related U.S. Application Data

(63) Continuation of application No. PCT/EP2017/059749, filed on Apr. 25, 2017.

(30) Foreign Application Priority Data

May 4, 2016 (DE) ..................... 10 2016 207 727.9

(51) Int. Cl.
 *H05B 33/08* (2020.01)
 *H05B 45/10* (2020.01)
 (Continued)

(52) U.S. Cl.
 CPC .......... *H05B 45/10* (2020.01); *B60Q 1/0088* (2013.01); *B60Q 3/80* (2017.02); *H05B 45/20* (2020.01); *H05B 45/24* (2020.01); *H05B 45/37* (2020.01)

(58) Field of Classification Search
 None
 See application file for complete search history.

(56) References Cited

U.S. PATENT DOCUMENTS

| | | |
|---|---|---|
| 8,624,527 B1 | 1/2014 | Meir et al. |
| 2007/0034775 A1 | 2/2007 | Cheng et al. |

(Continued)

FOREIGN PATENT DOCUMENTS

| | | |
|---|---|---|
| CN | 101569237 A | 10/2009 |
| CN | 101889478 A | 11/2010 |

(Continued)

OTHER PUBLICATIONS

Chinese-language Office Action issued in counterpart Chinese Application No. 201780008737.X dated Aug. 2, 2019 with English translation (16 pages).

(Continued)

*Primary Examiner* — Elmito Breval
(74) *Attorney, Agent, or Firm* — Crowell & Moring.LLP

(57) ABSTRACT

An illumination device for a motor vehicle includes one or more multi-color LED units which each have a settable color point and settable brightness, wherein each multi-color LED unit is an individual semiconductor component having multiple single-color LEDs of different colors and a microcontroller. The single-color LEDs and the microcontroller are surrounded by a housing of the semiconductor component. The microcontroller is designed to control each single-color LED of an associated multi-color LED unit depending on a current temperature value of the associated multi-color LED unit in such a way that a set color point and a set brightness are held constant during operation of the associated multi-color LED unit.

8 Claims, 2 Drawing Sheets

(51) Int. Cl.
  *H05B 45/20* (2020.01)
  *H05B 45/24* (2020.01)
  *B60Q 3/80* (2017.01)
  *B60Q 1/00* (2006.01)
  *H05B 45/37* (2020.01)

(56) References Cited

U.S. PATENT DOCUMENTS

| | | | |
|---|---|---|---|
| 2010/0045188 | A1 | 2/2010 | Ackermann et al. |
| 2010/0201951 | A1* | 8/2010 | Budinger ............ B60Q 3/47 353/13 |
| 2010/0259198 | A1 | 10/2010 | Morgenbrod |
| 2010/0301777 | A1 | 12/2010 | Kraemer |
| 2011/0084608 | A1* | 4/2011 | Lin ............ B60Q 3/47 315/77 |
| 2011/0215725 | A1 | 9/2011 | Paolini |
| 2012/0306370 | A1 | 12/2012 | Van De Ven et al. |
| 2012/0306378 | A1 | 12/2012 | Oh et al. |
| 2015/0002023 | A1 | 1/2015 | Imangholi et al. |
| 2015/0055668 | A1 | 2/2015 | Weber et al. |

FOREIGN PATENT DOCUMENTS

| | | |
|---|---|---|
| CN | 102687594 A | 9/2012 |
| CN | 104417424 A | 3/2015 |
| DE | 10 2006 037 292 A1 | 4/2007 |
| DE | 10 2013 011 188 A1 | 2/2014 |
| DE | 10 2013 015 343 A1 | 3/2015 |
| EP | 1 006 506 A1 | 6/2000 |
| EP | 2 953 174 A1 | 12/2015 |
| WO | WO 2004/086822 A1 | 10/2004 |
| WO | WO 2009/034060 A1 | 3/2009 |
| WO | WO 2011/106661 A1 | 9/2011 |
| WO | WO 2014/067830 A1 | 5/2014 |

OTHER PUBLICATIONS

Chinese-language Office Action issued in counterpart Chinese Application No. 201780009972.9 dated Aug. 2, 2019 with English translation (16 pages).

Chinese-language Office Action issued in counterpart Chinese Application No. 201780012422.2 dated Sep. 9, 2019 with English translation (18 pages).

International Search Report (PCT/ISA/210) issued in PCT Application No. PCT/EP2017/059749 dated Jul. 7, 2017 with English translation (five pages).

German-language Written Opinion (PCT/ISA/237) issued in PCT Application No. PCT/EP2017/059749 dated Jul. 7, 2017 (seven pages).

German-language Search Report issued in counterpart German Application No. 10 2016 207 727.9 dated Jan. 23, 2017 with partial English translation (11 pages).

International Search Report (PCT/ISA/210) issued in PCT Application No. PCT/EP2017/059752 dated Jul. 17, 2017 with English translation (five pages).

German-language Written Opinion (PCT/ISA/237) issued in PCT Application No. PCT/EP2017/059752 dated Jul. 17, 2017 (nine pages).

German-language Search Report issued in counterpart German Application No. 10 2016 207 730.9 dated Jan. 25, 2017 with partial English translation (12 pages).

International Search Report (PCT/ISA/210) issued in PCT Application No. PCT/EP2017/059750 dated Jul. 17, 2017 with English translation (five pages).

German-language Written Opinion (PCT/ISA/237) issued in PCT Application No. PCT/EP2017/059750 dated Jul. 17, 2017 (seven pages).

German-language Search Report issued in counterpart German Application No. 10 2016 207 728.7 dated Jan. 24, 2017 with partial English translation (11 pages).

* cited by examiner

ILLUMINATION DEVICE

CROSS REFERENCE TO RELATED APPLICATIONS

This application is a continuation of PCT International Application No. PCT/EP2017/059749, filed Apr. 25, 2017, which claims priority under 35 U.S.C. § 119 from German Patent Application No. 10 2016 207 727.9, filed May 4, 2016, the entire disclosures of which are herein expressly incorporated by reference.

This application contains subject matter related to U.S. application Ser. No. 16/178,945 and U.S. application Ser. No. 16/178,977 both entitled "Illumination Device" and filed on even date herewith Nov. 2, 2018.

BACKGROUND AND SUMMARY OF THE INVENTION

The invention relates to an illumination device, in particular for a motor vehicle.

It is known in the prior art to use multi-color LED units for illumination devices in motor vehicles. These LED units comprise a plurality of single-color LEDs and are generally controlled by LED drivers to vary the brightness and the color point (e.g. the mixed color). Used to this end is a module having a microprocessor that communicates with a motor vehicle databus and additionally drives the LED units, typically via PWM outputs. A suitable motor vehicle databus used frequently here is what is known as a LIN bus (LIN=local interconnect network).

Furthermore, novel multi-color LED units that have an integrated circuit are known from the prior art. In these LED units, the single-color LEDs and the integrated circuit are accommodated in a common package, as a result of which a high packing density can be achieved. The individual LED units are controlled via a data stream.

Until now, parameterizations, required in illumination devices with multi-color LED units for operating the individual LED units, are stored in a central processing module. This has the disadvantage that locally varying operating conditions of the individual LED units can be only insufficiently compensated, which can result in a non-uniform appearance of the illumination device.

Document WO 2014/067830 A1 discloses a method and an arrangement for the temperature-corrected control of LEDs by means of lookup tables. Here, a lookup table is provided in an LED module made of a plurality of LED channels for each target color point that is reachable by the LED module, the operating current for each LED channel being stored in said lookup table. A configuration of the LED module as a single semiconductor component with a temperature-corrected control contained therein cannot be gathered from this document.

It is the object of the invention to provide an illumination device of at least one multi-color LED unit with improved appearance.

This and other objects are achieved by way of an illumination device according to the invention preferably provided for a motor vehicle, such as a passenger car and possibly also a truck. The illumination device comprises one or more multi-color LED units which each have a settable color point and a settable brightness (i.e. light intensity). The term color point is well known to a person skilled in the art and describes the mixed color produced by the respective multi-color LED unit. The color point can be given for example as a point in a chromaticity diagram, in particular in a chromaticity diagram of the CIE color space.

In the illumination device according to the invention, each multi-color LED unit is an individual semiconductor device having a plurality of, and preferably at least three, single-color LEDs of different colors. The individual semiconductor device furthermore comprises a microcontroller. The single-color LEDs and the microcontroller are enclosed by a package of the semiconductor device, i.e. they are accommodated in a common package of the semiconductor device. In the illumination device according to the invention, the microcontroller is set up to control each single-color LED of a respective multi-color LED unit depending on an instantaneous (i.e., currently present) temperature value of the respective multi-color LED unit in such a way that a set color point and a set brightness are kept constant during the operation of the respective multi-color LED unit.

The illumination device according to the invention has the advantage that an algorithm for temperature compensation is integrated in a microcontroller, which is a constituent part of an individual semiconductor device of the multi-color LED unit. In this way, it is possible to set a desired brightness or a desired color point individually and highly accurately taking account of local temperatures of the individual multi-color LED units as a result of which a continuously uniform appearance of the illumination device is achieved.

In a preferred variant, the microcontroller of the respective multi-color LED unit is set up to control each single-color LED on the basis of the control of the operating current of the respective single-color LED, for example by way of pulse width modulation.

In a particularly preferred embodiment, integrated within the semiconductor device of at least some of the multi-color LED units is a temperature sensor, which is set up to measure the instantaneous temperature value of the respective multi-color LED unit. As a result of this, the instantaneous temperature of the multi-color LED unit is ascertained particularly exactly.

In a further variant, a temperature sensor for measuring the instantaneous temperature value is dispensed with. Instead, the microcontroller of at least some of the multi-color LED units is set up to ascertain the temperature value based on at least some of the operating voltages and/or operating currents of the single-color LEDs of the respective multi-color LED unit.

Preferably, the aforementioned ascertainment of the instantaneous temperature value is carried out on the basis of tables or characteristics. In contrast to a table, a characteristic describes a continuous relationship between a plurality of variables. For the purposes of realizing such an embodiment, characteristics or tables for a respective single-color LED of at least some of the single-color LEDs of the respective multi-color LED unit are stored in the microcontroller of at least some of the multi-color LED units, wherein a respective characteristic or table is specific to an operating current of the respective single-color LED. Expressed differently, a plurality of characteristics exist for the various settable operating currents. The respective characteristic or table specifies a temperature depending on the operating voltage of the respective single-color LED. Here, the microcontroller is set up to read the temperature for the instantaneous operating voltage, which is measurable using a suitable sensor, from the characteristic or table for the instantaneous operating current, which is set in the respective single-color LED, and to ascertain the instantaneous temperature value on the basis of the read temperature or temperatures. Should temperature values of a plurality of, or of all, single-color LEDs of the corresponding multi-color LED unit be ascertained in the process, it is possible, for example, to use the mean value of these read temperatures as the instantaneous temperature value.

In a further preferred variant of the illumination device according to the invention, the microcontroller of at least some of the multi-color LED units is configured such that, if the instantaneous temperature value exceeds a specified threshold, it reduces the brightness of the respective multi-color LED unit (i.e. the multi-color LED unit to which the microcontroller belongs). This ensures that the multi-color LED unit is not damaged due to excessive temperatures. In this context, a specification may be preferably made according to which the brightness of the multi-color LED unit is decreased more strongly the more the specified threshold is exceeded. If needed, the brightness of the multi-color LED unit can also be lowered to zero, i.e. the corresponding multi-color LED unit can be switched off. This can be achieved for example by way of a second threshold that is higher than the specified threshold. If the instantaneous temperature exceeds this second threshold, the multi-color LED unit will be switched off.

In a particularly preferred embodiment, the illumination device according to the invention comprises a plurality of multi-color LED units, which are connected to an internal databus (i.e. a databus within the illumination device). This internal databus in turn is coupled to a processing module, wherein the processing module is set up to pass internal control commands for setting the brightness and the color point of the individual multi-color LED units to the internal databus. The above processing module is preferably set up to receive external control commands from a motor vehicle databus and convert them to the above internal control commands.

In the embodiment that was just described, simple control of the individual multi-color LED units via an internal databus is achieved. The internal databus can be e.g. an SPI databus (SPI=serial protocol interface) or possibly even a different databus, such as e.g. a differential databus, which codes digital data between two lines via a voltage difference. The above motor vehicle databus can be, for example, a LIN bus (LIN=local interconnect network) or a CAN bus (CAN=controller area network).

In a further preferred embodiment, at least some of the multi-color LED units comprise one or more RGB-LED units and/or RGBW-LED units. In a manner that is known per se, an RGB-LED unit comprises a red, green and blue single-color LED, and an RGBW-LED unit comprises, in addition to a red, green and blue LED, a white light LED.

In a particularly preferred embodiment, the illumination device is an interior illumination means in a motor vehicle or possibly an exterior illumination means on the outside of the motor vehicle. Hereby, pleasing light effects with a homogeneous appearance can be generated.

In addition to the above-described illumination device, the invention relates to a motor vehicle, in particular to a passenger car or possibly also a truck, which comprises one or more of the illumination devices according to the invention or of preferred variants of said illumination devices.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
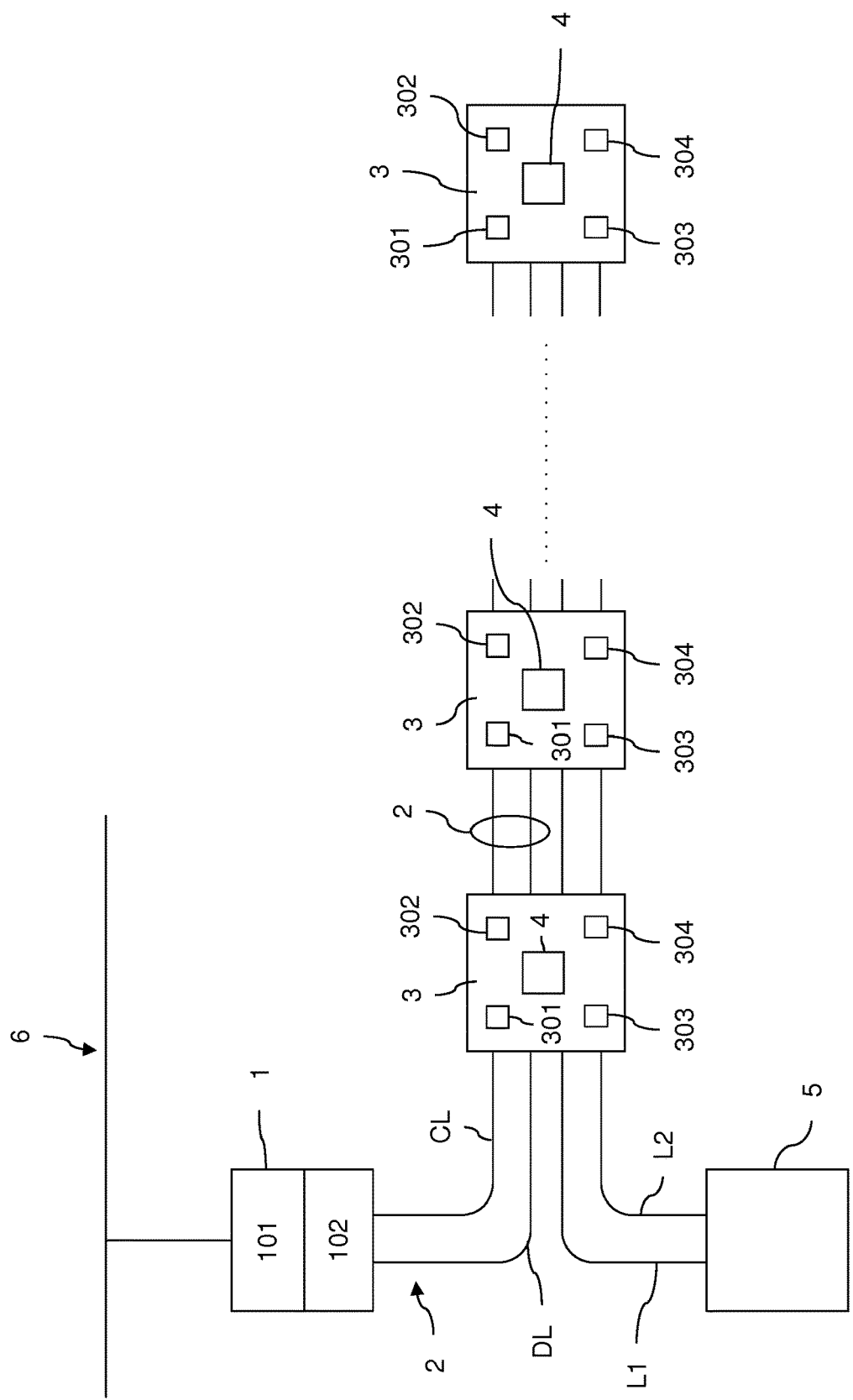
FIG. 1 shows a schematic illustration of an embodiment of an illumination device according to the invention.

One embodiment of the invention will be described below with reference to an illumination device that is installed in a motor vehicle in the form of interior illumination and comprises, as the light-emitting device, a multiplicity of multi-color LED units 3, which are arranged on a strip. These multi-color LED units, which will also be referred to below simply as LED units, in each case represent an individual semiconductor device having a plurality of single-color LEDs 301 to 304 and a microcontroller 4. The single-color LEDs and the microcontroller are integrated in a common package of the semiconductor device. The single-color LED 301 is a red LED, the single-color LED 302 is a green LED, the single-color LED 303 is a blue LED, and the single-color LED 304 is a white LED. With the LED units which are arranged in the manner of a strip, it is possible to achieve very high packing density (from 144 to 367 LEDs/m, depending on the type of package).

The individual LED units 3 are controlled via a digital data stream in the form of a bitstream, which is passed on to the individual LED units using an internal databus 2 (i.e. a databus that is provided internally in the illumination device). The internal databus comprises a line CL for the cycle and a line DL for the bitstream.

The signals on the internal databus 2 originate from a processing module 1, which is coupled to a LIN bus 6 of the motor vehicle. The processing module comprises a LIN transceiver 101, which taps corresponding digital signals from the LIN bus 6 for controlling the LED units 3, and a microprocessor 102, which converts the tapped signals to corresponding data signals on the data line DL. The signals that have been passed on along the LIN bus 6 comprise signals which are intended for the illumination device and define a light pattern that is to be set for the illumination device. These signals in turn originate from a controller of the motor vehicle, which defines, for example on the basis of an input by the driver, the light pattern to be generated and passes it to the LIN bus as a corresponding signal. Via the processing module 1, it is recognized whether the light pattern is provided according to the current signal on the LIN bus 6 for the illumination device. If this is the case, this signal is converted to a corresponding signal for the internal databus 2 using the microprocessor 102.

The internal databus 2 can here be an SPI bus, for example. The signals for the SPI bus are preferably produced here by the microprocessor 102 by way of software SPI. Software SPI is known per se from the prior art and represents a program library with which any free pins of the microprocessor 102 can be used to output signals to the SPI bus. Alternatively, it is possible to use hardware SPI. In this case, special SPI pins for the output of signals to the SPI bus are provided. The use of software SPI has the advantage that, in the internal databus 2, a plurality of lines DL and CL for controlling a relatively large number of LED units 3 may be provided. As an alternative to an SPI bus, the internal databus can also be configured as a differential databus or as any other desired databus. A differential databus is characterized in that it codes digital data via a voltage difference between two lines.

In the embodiment of FIG. 1, in addition to the lines CL and DL, two current lines L1 and L2 are provided, which are connected to a DC voltage supply 5. Based on the bitstream received by the data line DL, a PWM modulation of the current which is supplied to the individual LEDs 301 to 304 is performed in order to control hereby the LEDs in accordance with the bitstream on the data line DL.

Figure 2:
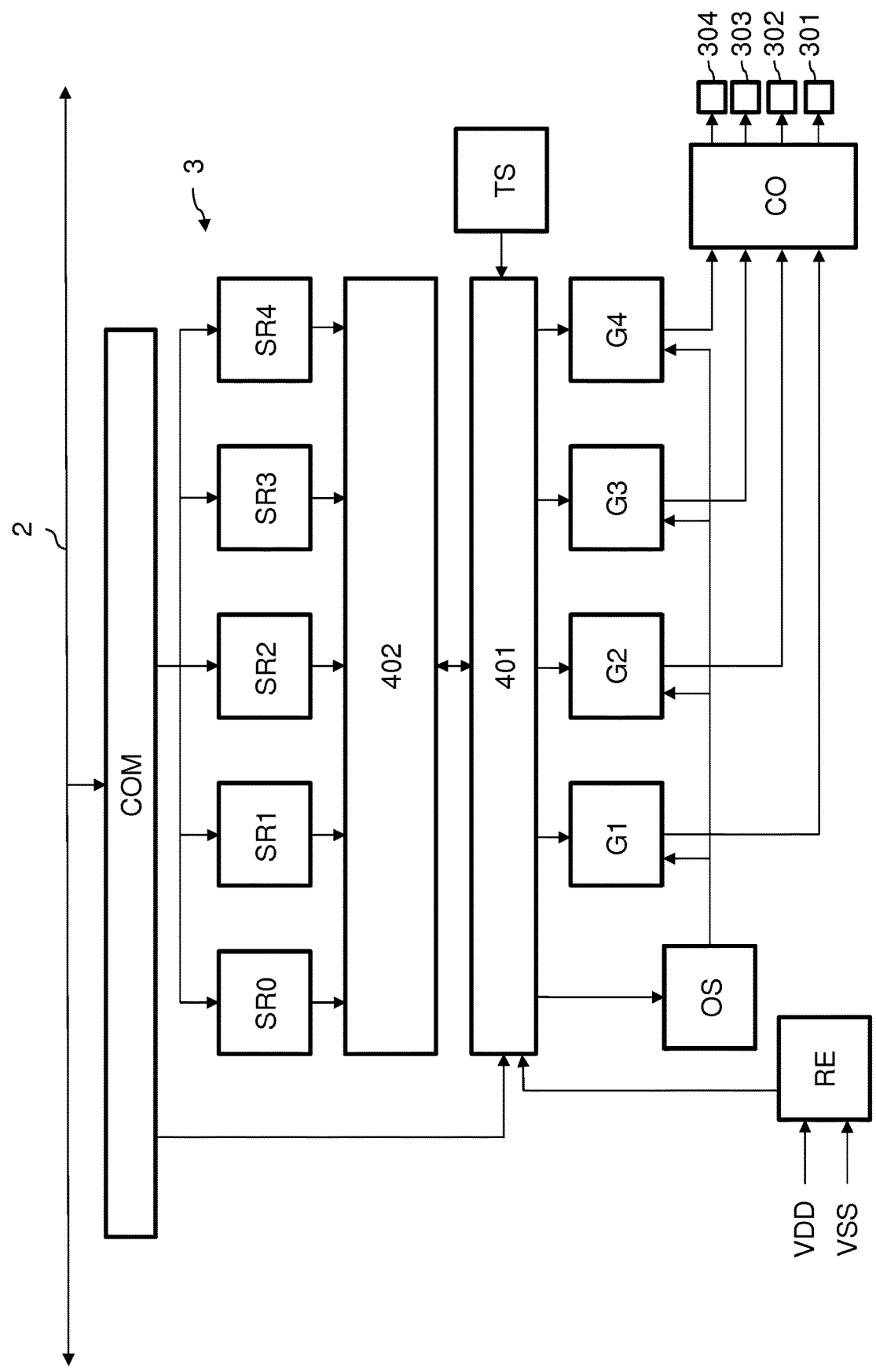
FIG. 2 shows a detailed view of an LED unit from FIG. 1.

The setup of an individual LED unit 3 from FIG. 1 is shown in detail in FIG. 2. All components of the LED unit shown are integrated here in a single semiconductor device. The signals of the databus 2 are received by a communication interface COM of the LED unit 3. The cycle signal of the cycle line CL is passed on to the microprocessor 401 (described further below), whereas the data stream is passed to the data line DL after decoding in the communication interface COM on 8-bit shift registers SR0, SR1, SR2, SR3 and SR4. The value output by the shift register SR0 here shows the desired total brightness of the LED unit, whereas the color components of the individual single-color LEDs are output for producing the desired mixed color via the values of the shift registers SR1 to SR4. In particular, the color component of the red LED 301 is output by the shift register SR1, the color component of the green LED 302 is output via the shift register SR2, the color component of the blue LED 303 is output by the shift register SR3, and the color component of the white LED 304 is output by the shift register SR4.

The values of the individual shift registers are fed to the microcontroller 4, which consists of a logic or a microprocessor 401 and an associated non-volatile EEPROM memory 402. Saved in this memory are, inter alia, calibration data, which originate from a calibration process of the LED unit and define for a specified standard temperature value of the LED unit how the operating currents of the individual single-color LEDs are to be set so that the total brightness value originating from the shift register SR0 and the color mixture (i.e. the color point in this respect) according to the values from the shift registers SR1 to SR4 are achieved.

The microprocessor 401 accesses the values stored in the memory 402 and, further, receives the instantaneous temperature value of a temperature sensor TS, which is integrated in the semiconductor component of the LED unit. Here, saved in the microprocessor is a temperature algorithm which, with access to the memory 402, determines the corresponding operating currents for the aforementioned standard temperature value and suitably corrects these operating currents should the instantaneous temperature value originating from the temperature sensor TS deviate from the standard temperature value. Here, the correction is configured in such a way that the desired brightness and the desired color point in accordance with the values from the shift registers are also correctly set in the case of temperature variations.

Consequently, the temperature algorithm of the microprocessor 401 takes account of the fact that the temperature of the LED unit 3 has an effect on the operation thereof, and so a temperature-dependent correction has to be carried out in order to reach a desired brightness and a desired color point. Corresponding algorithms for temperature compensation are known per se from the prior art. However, such an algorithm is stored for the first time in a microcontroller that is a constituent part of the semiconductor component of an LED unit. In this way, the operation of the individual multi-color LED units in an illumination device can be adapted individually and very accurately to the current temperature.

The operating currents for the individual LEDs 301 to 304 are provided via a voltage regulator RE, which receives the positive voltage VDD and the negative voltage VSS from the voltage supply 5 shown in FIG. 1. The microprocessor 401 furthermore generates a cycle for a corresponding oscillator OS, which is passed on to PWM generators G1, G2, G3 and G4. The operating currents of the individual LEDs 301 to 304 are produced in the generators G1 to G4 via pulse width modulation. The values of the operating currents originating from the algorithm for temperature compensation are passed on to the individual generators G1 to G4 by the microprocessor 401. The generator G1 produces the current for the red LED 301 using pulse width modulation, the generator G2 produces the current for the green LED 302, the generator G3 produces the current for the blue LED 303, and the generator G4 produces the current for the white LED 304. Via the PWM signals generated by the individual generators, which reach the single-color LEDs via the current output CO, the corresponding light is then set with the desired brightness and the desired color point for the LED unit 3 in accordance with the signal which reaches the LED unit via the internal databus 2.

In the embodiment just described, the instantaneous temperature value is measured by a temperature sensor TS on the semiconductor device of the LED unit 3. There may also be the possibility, instead of measuring a temperature value, of ascertaining the instantaneous temperature by way of characteristics which indicate for respective operating currents a relationship between the operating voltage of the individual single-color LEDs and the temperature of the LED unit. The operating voltage can be measured by a suitable voltage sensor in the LED unit. A type of temperature ascertainment of this type is known to a person skilled in the art and is described for example in document US 2015/0002023 A1.

The embodiments of the invention described above have a number of advantages. In particular, for the first time, an algorithm for temperature compensation is integrated in a semiconductor device of a multi-color LED unit. Consequently, an integrated logic in a multi-color LED module is used to implement a temperature compensation thereby. As a result, the desired brightness and the desired color point can be set individually and highly accurately for each LED unit depending on the temperature at the installation location of the respective LED unit. In this way, it is possible to ensure a uniform appearance of the LED unit and of an LED band made of many LED units over the entire service life.

LIST OF REFERENCE SIGNS

1 processing module
101 LIN transceiver
102 microprocessor
2 internal databus
3 multi-color LED units
301, 302, 303, 304 single-color LEDs
4 microcontroller
401 microprocessor
402 EEPROM
5 voltage supply
6 motor vehicle databus
CL line for cycle signal
DL data line
L1, L2 current lines
COM communication interface
SR0, SR1, SR2, SR3, SR4 shift registers
TS temperature sensor
G1, G2, G3, G4 PWM generators
OS oscillator
RE voltage regulator
VDD, VSS voltages
CO current output

What is claimed is:

1. An illumination device, comprising:
   one or more multi-color LED units which each have a settable color point and a settable brightness, wherein
   each multi-color LED unit is an individual semiconductor device with multiple single-color LEDs of different colors and a microcontroller, wherein
   the single-color LEDs and the microcontroller are enclosed by a package of the semiconductor device,
   the microcontroller is configured to control each single-color LED of a respective multi-color LED unit depending on an instantaneous temperature value of the respective multi-color LED unit such that a set color point and a set brightness are kept constant during the operation of the respective multi-color LED unit, and
   integrated in the semiconductor device of at least some of the multi-color LED units is a temperature sensor, which is set up to measure the instantaneous temperature value of the respective multi-color LED unit.

2. The illumination device as claimed in claim 1, wherein the microcontroller of at least some of the multi-color LED units is configured to control each single-color LED on the basis of controlling an operating current of the respective single-color LED.

3. The illumination device as claimed in claim 1, wherein the microcontroller of at least some of the multi-color LED units is configured such that, if an instantaneous temperature value exceeds a specified threshold, it reduces the brightness of the multi-color LED unit.

4. The illumination device as claimed in claim 1, wherein the illumination device comprises a plurality of multi-color LED units, which are connected to an internal databus, which is coupled to a processing module, and
   the processing module is configured to pass internal control commands for setting brightness and color point of the individual multi-color LED units to the internal databus.

5. The illumination device as claimed in claim 4, wherein the processing module is configured to receive external control commands from a motor vehicle databus and convert said commands to the internal control commands.

6. The illumination device as claimed in claim 1, wherein at least some of the multi-color LED units comprise one or more RGB-LED units and/or RGBW-LED units.

7. The illumination device as claimed in claim 1, wherein the illumination device is an interior illumination device in a motor vehicle or an exterior illumination device on an exterior of the motor vehicle.

8. A motor vehicle, comprising one or more illumination devices as claimed in claim 1.

* * * * *